United States Patent
Patch et al.

(10) Patent No.: US 11,662,045 B2
(45) Date of Patent: May 30, 2023

(54) FLUID CONNECTION SYSTEM WITH A PUSH-TO-CONNECT FACE SEAL CONFIGURATION

(71) Applicant: Parker-Hannifin Corporation, Cleveland, OH (US)

(72) Inventors: Jason D. Patch, Columbus, OH (US); Phillip A. Landis, Hilliard, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 338 days.

(21) Appl. No.: 17/011,089

(22) Filed: Sep. 3, 2020

(65) Prior Publication Data

US 2021/0131595 A1 May 6, 2021

Related U.S. Application Data (60) Provisional application No. 62/927,742, filed on Oct. 30, 2019.

(51) Int. Cl.
*F16L 37/088* (2006.01)
*F16J 15/34* (2006.01)

(52) U.S. Cl.
CPC ......... *F16L 37/088* (2013.01); *F16J 15/3452* (2013.01)

(58) Field of Classification Search
CPC ....... F16L 23/16; F16L 23/162; F16L 23/003; F16L 23/006; F16L 37/08; F16L 37/088;
(Continued)

(56) References Cited

U.S. PATENT DOCUMENTS 3,074,430 A * 1/1963 La Belle ................. F16L 29/04
137/871
3,235,224 A 2/1966 Grove
(Continued)

FOREIGN PATENT DOCUMENTS

| CN | 204387550 U | 6/2015 |
|---|---|---|
| CN | 107281460 A | 9/2017 |
| DE | 4305609 | 11/1993 |

OTHER PUBLICATIONS

Parker's Universal Push-to-Connect (UPTC) Assembly Bulletin, Feb. 2008.
(Continued)

*Primary Examiner* — Aaron M Dunwoody
(74) *Attorney, Agent, or Firm* — McDonnell Boehnen Hulbert & Berghoff LLP (57) ABSTRACT

An example fitting includes: a fitting body comprising an exterior annular groove formed and configured to receive a retaining snap ring to couple the fitting body to a fluid line connector; a seal carrier slidably accommodated in the fitting body and having: (i) a first end face, (ii) a second end face opposite the first end face, (iii) a first annular groove formed in an exterior peripheral surface of the seal carrier, wherein the first annular groove is configured to receive a radial seal therein, and (iv) a second annular groove formed in the second end face, wherein the second annular groove is configured to receive a face seal therein; and a spring having a first end fixedly disposed within the fitting body and a second end interfacing with the first end face of the seal carrier such that the spring applies a biasing force on the seal carrier.

15 Claims, 9 Drawing Sheets

(58) Field of Classification Search
CPC . F16L 37/084; F16L 37/0887; F16L 2201/80;
F16L 37/35; F16L 37/34; F16L 37/32;
F16L 37/38; F16L 37/42; F16J 15/3452;
F16J 15/48; F16J 15/06; F16J 15/3436;
F16J 15/34
USPC .................................................. 285/321, 901
See application file for complete search history.

(56) References Cited

U.S. PATENT DOCUMENTS

| | | |
|---|---|---|
| 3,326,518 A | 6/1967 | Grove |
| 3,365,219 A | 1/1968 | Nicolaus |
| 3,678,956 A | 7/1972 | Ebin |
| 3,727,952 A | 4/1973 | Richardson |
| 3,899,199 A | 8/1975 | Garey |
| 4,465,096 A * | 8/1984 | Voisine ................. F16L 37/088 137/614.04 |
| 4,477,055 A | 10/1984 | Partridge |
| 4,844,512 A | 7/1989 | Gahwiler |
| 4,887,643 A | 12/1989 | Tomlin et al. |
| 5,209,528 A | 5/1993 | Weh et al. |
| 6,203,435 B1 | 3/2001 | Falgout |
| 6,206,432 B1 | 3/2001 | Kamiyama |
| 7,914,050 B2 | 3/2011 | Udhofer et al. |
| 8,240,719 B2 | 8/2012 | Udhofer et al. |

OTHER PUBLICATIONS

Non-Final Office Action issued by the U.S. Patent Office in U.S. Appl. No. 15/734,308 dated Sep. 21, 2022.

\* cited by examiner

1102 PROVIDING A FITTING COMPRISING: (I) A FITTING BODY HAVING AN EXTERIOR ANNULAR GROOVE DISPOSED ABOUT AN EXTERIOR PERIPHERAL SURFACE OF THE FITTING BODY, (II) A SPRING, AND (III) A SEAL CARRIER HAVING A FIRST END FACE INTERFACING WITH THE SPRING, WHEREIN THE SEAL CARRIER COMPRISES: (A) A FIRST ANNULAR GROOVE ON AN EXTERIOR PERIPHERAL SURFACE OF THE SEAL CARRIER, WHEREIN THE FIRST ANNULAR GROOVE HAS A RADIAL SEAL DISPOSED THEREIN, AND (B) A SECOND ANNULAR GROOVE FORMED IN A SECOND END FACE OF THE SEAL CARRIER, WHEREIN THE SECOND ANNULAR GROOVE HAS A FACE SEAL DISPOSED THEREIN

1104 PROVIDING A FLUID LINE CONNECTOR COMPRISING: (I) A COUPLING NUT HAVING AN INTERIOR ANNULAR GROOVE DISPOSED IN AN INTERIOR PERIPHERAL SURFACE OF THE COUPLING NUT, (II) A RETAINING SNAP RING DISPOSED IN THE INTERIOR ANNULAR GROOVE, (III) A FLUID LINE COMPRISING A FLANGED END HAVING A FLAT SURFACE

1106 ALIGNING THE FITTING TO THE FLUID LINE CONNECTOR SUCH THAT THE SECOND END FACE OF THE SEAL CARRIER HAVING THE FACE SEAL INTERFACES WITH THE FLAT SURFACE OF THE FLANGED END OF THE FLUID LINE

1108 MOVING THE FITTING IN AN AXIAL DIRECTION RELATIVE TO THE COUPLING NUT UNTIL THE EXTERIOR ANNULAR GROOVE OF THE FITTING BODY IS ALIGNED WITH THE INTERIOR ANNULAR GROOVE OF THE COUPLING NUT AND THE RETAINING SNAP RING OCCUPIES AN ANNULAR SPACE FORMED BETWEEN THE INTERIOR ANNULAR GROOVE AND THE EXTERIOR ANNULAR GROOVE, THEREBY AXIALLY RETAINING THE COUPLING NUT TO THE FITTING BODY AND COUPLING THE FLUID LINE TO THE FITTING, WHEREIN THE SPRING APPLIES A BIASING FORCE ON THE SEAL CARRIER TOWARD THE FLAT SURFACE OF THE FLANGED END OF THE FLUID LINE TO MAINTAIN CONTACT THEREBETWEEN

FLUID CONNECTION SYSTEM WITH A PUSH-TO-CONNECT FACE SEAL CONFIGURATION

CROSS REFERENCE TO RELATED APPLICATION

The present application claims priority to U.S. Provisional patent application No. 62/927,742 filed on Oct. 30, 2019, and entitled "Fluid Connection System with a Push-to-Connect Face Seal Configuration," the entire contents of which are herein incorporated by reference as if fully set forth in this description.

BACKGROUND

In fluid systems, tubes, pipes, and hoses can be used to transfer different types of fluids from one location to another. Fittings are used to connect or adapt pipes, tubes, or hoses together to form the single line or to connect manifolds and equipment. In some instances, the mating tube or manifold can have a nut with threads that engage the corresponding threads of a fitting or adaptor. In examples, these threads can be tapered threads, and the tapered threads are used to create a mechanical seal connection between the fitting with tapered threads and a tube or a manifold. In these examples, a large wrench or power equipment can be used to apply a large torque to tighten the threads. Applying such a large torque by an operator can be challenging. For instance, the fitting can be disposed at a tight space where inserting a wrench is difficult. Further, applying such large torques can lead to operator fatigue.

Further, galling of the threads can occur with the application of large forces and the inherent nature of the mechanical metal-to-metal seal of tapered threads. Galling occurs as a result of friction between the threads of the fitting and corresponding threads in the tube or manifold. Such friction can cause cold- or friction-welding. When the fitting has cold- or friction-welded, it might not be possible to remove the fitting from the tube or manifold, thereby causing rework or replacement.

Conversely, under-torqueing the fitting-nut connection (e.g., torqueing the nut to a torque level that is less than a recommended torque level) can cause the connection to be loose and leakage to occur. Further, during operation of a fluid system, pressure and or vibration in the tubes, pipes, or hoses can cause the fitting to rotate, thereby loosening the threaded connection between the fitting and the mating tube, pipe, hose, or manifold. With a loose connection, fluid leakage can occur at the fitting, thereby leading to efficiency loss or loss of primary function of the system that includes the fitting.

Therefore, it may be desirable to have a fluid connection system with a fitting that can be connected to a mating component (e.g., a tube, hose, manifold, etc.) without using threads, while maintaining a sealed connection that precludes fluid leakage. It is with respect to these and other considerations that the disclosure made herein is presented.

SUMMARY

The present disclosure describes implementations that relate to a fluid connection system with a push-to-connect face seal configuration.

In a first example implementation, the present disclosure describes a fitting. The fitting includes: (i) a fitting body comprising an exterior annular groove formed in an exterior peripheral surface of the fitting body and configured to receive a retaining snap ring to couple the fitting body to a fluid line connector; (ii) a seal carrier slidably accommodated in the fitting body and having: (a) a first end face, (b) a second end face opposite the first end face, (c) a first annular groove formed in an exterior peripheral surface of the seal carrier, wherein the first annular groove is configured to receive a radial seal therein, and (d) a second annular groove formed in the second end face, wherein the second annular groove is configured to receive a face seal therein; and (iii) a spring having a first end fixedly disposed within the fitting body and a second end interfacing with the first end face of the seal carrier such that the spring applies a biasing force on the seal carrier.

In a second example implementation, the present disclosure describes an assembly. The assembly includes a fluid line connector comprising: a coupling nut having an interior annular groove formed in an interior peripheral surface of the coupling nut; and a fluid line having a flat surface disposed within the coupling nut. The assembly further includes a fitting comprising: (i) a fitting body disposed, at least partially, within the coupling nut and comprising an exterior annular groove formed in an exterior peripheral surface of the fitting body, wherein the exterior annular groove of the fitting body is axially-aligned with the interior annular groove of the coupling nut, thereby forming an annular space therebetween; (ii) a seal carrier slidably accommodated in the fitting body and having: (a) a first end face, (b) a second end face opposite the first end face, (c) a first annular groove formed in an exterior peripheral surface of the seal carrier, wherein the first annular groove has a radial seal disposed therein, and (d) a second annular groove formed in the second end face, wherein the second annular groove has a face seal disposed therein; and (iii) a spring having a first end fixedly disposed within the fitting body and a second end interfacing with the first end face of the seal carrier such that the spring applies a biasing force on the seal carrier toward the flat surface of the fluid line of the fluid line connector to maintain contact between the second end face of the seal carrier having the face seal and the flat surface of the fluid line. The assembly also includes a retaining snap ring disposed in the annular space formed between the interior annular groove of the coupling nut and the exterior annular groove of the fitting body, thereby coupling the fitting body to the coupling nut.

In a third example implementation, the present disclosure describes a method. The method includes: (i) providing a fitting comprising: (a) a fitting body having an exterior annular groove disposed about an exterior peripheral surface of the fitting body, (b) a spring, and (c) a seal carrier having a first end face interfacing with the spring, wherein the seal carrier comprises: (a) a first annular groove on an exterior peripheral surface of the seal carrier, wherein the first annular groove has a radial seal disposed therein, and (b) a second annular groove formed in a second end face of the seal carrier, wherein the second annular groove has a face seal disposed therein; (ii) providing a fluid line connector comprising: (a) a coupling nut having an interior annular groove disposed in an interior peripheral surface of the coupling nut, (b) a retaining snap ring disposed in the interior annular groove, (c) a fluid line comprising a flanged end having a flat surface; (iii) aligning the fitting to the fluid line connector such that the second end face of the seal carrier having the face seal interfaces with the flat surface of the flanged end of the fluid line; and (iv) moving the fitting in an axial direction relative to the coupling nut until the exterior annular groove of the fitting body is aligned with the interior annular groove of the coupling nut and the retaining snap ring occupies an annular space formed between the interior annular groove and the exterior annular groove, thereby axially retaining the coupling nut to the fitting body and coupling the fluid line to the fitting, wherein the spring applies a biasing force on the seal carrier toward the flat surface of the flanged end of the fluid line to maintain contact therebetween.

In a fourth example implementation, the present disclosure describes a fluid connector system. The fluid connector system includes a coupling nut having an interior annular groove formed in an interior peripheral surface of the coupling nut; and a retaining snap ring disposed in the interior annular groove of the coupling nut. The fluid connector system further includes a fitting comprising: (i) a fitting body configured to be disposed, at least partially, within the coupling nut and comprising an exterior annular groove formed in an exterior peripheral surface of the fitting body, wherein the exterior annular groove of the fitting body is configured to receive the retaining snap ring therein to couple the fitting body to the coupling nut; (ii) a seal carrier slidably accommodated in the fitting body and having: (a) a first end face, (b) a second end face opposite the first end face, (c) a first annular groove formed in an exterior peripheral surface of the seal carrier, wherein the first annular groove is configured to receive a radial seal therein, and (d) a second annular groove formed in the second end face, wherein the second annular groove is configured to receive a face seal therein; and (iii) a spring having a first end fixedly disposed within the fitting body and a second end interfacing with the first end face of the seal carrier such that the spring applies a biasing force on the seal carrier.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 11 is a flowchart of a method for assembling the fitting shown in FIGS. 1-2 and the fluid line connector shown in FIGS. 6-7, in accordance with an example implementation.

DETAILED DESCRIPTION

A fitting is used in fluid systems to connect pipes, tubes, or hoses to each other or to couple pipes, tubes or hoses to a manifold or equipment. The term "fluid" is used herein as including any gas or liquid. The term "fluid line" is used throughout the disclosure to encompass a pipe, tube, or hose.

Fittings have several types and shapes. For example, an elbow fitting is installed between two lengths of pipe (or tubing) to allow a change of direction, e.g., usually a 90° or 45° angle. Ends of an elbow fitting can be machined for butt welding, threaded (e.g., female threads), or socketed. When the ends differ in size, the elbow fitting can be referred to as a reducing (or reducer) elbow fitting. A coupling fitting is configured to connect two pipes. If sizes of the pipes differ, the fitting is known as a reducing coupling, reducer, or an adapter. Other types of fittings include union fittings, nipple fittings, reducer fitting, double-tapped bushing fitting, tee fitting, diverter fitting, as examples.

When installing a piping or plumbing system, it is desirable to have fittings that are leak-proof and make reliable connections. Several connection methods can be used to couple fluid lines to a fitting include welding and threading. In examples, threads are used to make a connection that can withstand high pressure levels. In these examples, a threaded pipe can have a screw thread at one or both ends for assembly. For instance, a steel pipe can be joined with threaded connections where tapered threads are cut or machined into the end of the fitting. A sealant can be applied in the form of thread-sealing compound or thread seal tape and the fitting is threaded into another fluid line having a threaded nut or into a manifold using a wrench. Tapered threads are used in high pressure application because tapered threads create a seal due to the thread crest to root interference, assisted by the thread seal tape. In contrast, parallel threads include connecting surfaces that are flat-machined, and a sealing ring is used between the fitting and the fluid line.

In example applications where high pressure fluids are being transferred through fluid lines, connecting these fluid lines with fittings can involve tightening the threads of the fitting with a high torque applied with a pipe wrench or power equipment. For example, for a fitting having 1.5-2 inch diameter, torques of 200-500 pound-foot (lbs-ft) can be applied to make a tight threaded connection and achieve a leak-proof connection. Such high torques can be difficult to achieve manually, and in some application where the fitting is disposed in tight spaces, it may be difficult to insert a wrench in such tight spaces to tighten the fitting. Under-torqueing the fitting to a torque level below a recommended torque level can cause leakage.

Further, relying on a tight threaded connection to preclude or limit leakage can cause some performance deterioration overtime. For instance, if the fitting is used in a high pressure application or if the fitting and the fluid lines are subjected to vibrations during operation, "hose kicking" can occur, where the fitting can rotate, thereby loosening the threaded connection between the fitting and the fluid lines the fitting is connecting together. As a result of such loosening, galling can occur as the thread surfaces of the fitting and respective thread surface of the fluid lines slide relative to each other.

Galling is a form of wear caused by adhesion between sliding surfaces of the threads of the fitting and corresponding threads of the fluid lines. When a material galls, some of it is pulled with the contacting surface, especially if there is a large amount of force compressing the surfaces together. Galling is caused by a combination of friction and adhesion between the thread surfaces, followed by slipping and tearing of crystal structure beneath the surface. Such friction, adhesion, slipping, and tearing can cause some material to be stuck or friction-welded to an adjacent surface, whereas the galled material may appear gouged with balled-up or torn lumps of material stuck to its surface. Thus, galling involves a transfer of material as it is adhesively pulled from one surface of the fitting or fluid line, leaving the material stuck to the other in the form of a raised lump referred to as "gall."

Galling can cause the threads to seize and tear free from either the fitting or the fluid line. Such seizing or tearing can cause a leakage point at the connection between the fitting and the fluid line, thereby leading to fluid leakage at the connection. In some cases, the fitting may lock up, leading to breakage of the fitting or the tool turning it.

Therefore, it may desirable, to have a fitting that precludes leakage without using a threaded connection of the fitting with the fluid line. Disclosed herein are methods, systems, fittings, assemblies and fluid connection systems that involve a push-to-connect configuration to connect a fitting to a fluid line. Particularly, a connection between a fitting and a fluid line is achieved using a retaining snap ring. A spring-loaded seal carrier having a radial seal and a face seal is used to maintain a sealed connection between the fitting and the fluid line even if the retaining snap ring allows for some relative motion or "slop" between the fitting and the fluid line.

Figure 1:
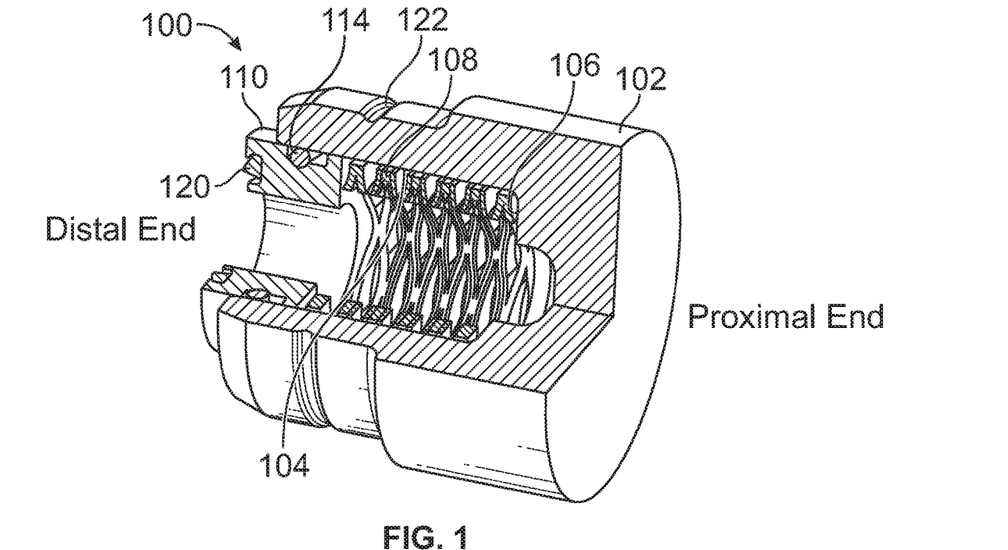
FIG. 1 illustrates a perspective partial cross-sectional view of a fitting, in accordance with an example implementation.
Figure 2:
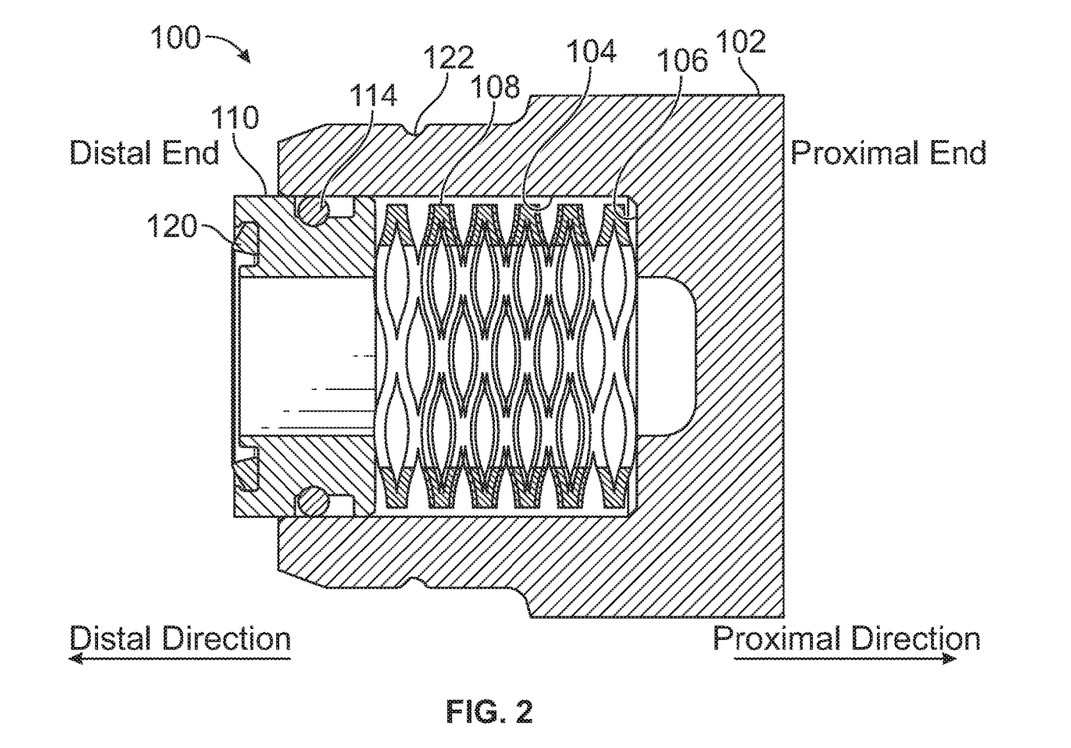
FIG. 2 illustrates a partial cross-sectional side view of the fitting shown in FIG. 1, in accordance with an example implementation.

FIG. 1 illustrates a perspective partial cross-sectional view of a fitting 100, and FIG. 2 illustrates a partial cross-sectional side view of the fitting 100, in accordance with an example implementation. FIGS. 1 and 2 are described together. One end of the fitting 100 is shown in the figures to illustrate features disclosed herein without showing the other end, which can have any configuration that renders the fitting 100 any type of fitting, e.g., an elbow fitting, a straight fitting, union fitting, a T-fitting, etc.

The fitting 100 has a fitting body 102 that includes or defines a longitudinal cylindrical cavity therein. The longitudinal cylindrical cavity of the fitting body 102 operates as a fluid passage that allows fluid flow therethrough.

The fitting body 102 includes a counterbore 104 that forms an annular shoulder 106. In other words, the annular shoulder 106 is formed as a protrusion from an interior peripheral surface of the fitting body 102.

The fitting 100 further includes a spring 108. The spring 108 is depicted as a wave spring as an example for illustration only. Other types of springs (e.g., a coil spring) can be used. The spring 108 has a proximal or first end that rests, or is secured, against the annular shoulder 106 of the fitting body 102.

The fitting 100 also includes a seal carrier 110 that can be cylindrical in shape and is hollow to allow fluid flow therethrough. A second or distal end of the spring 108 rests against a proximal end of the seal carrier 110. As the proximal end of the spring 108 is fixed at the annular shoulder 106 while its distal end rests against the seal carrier 110, the spring 108 applies a biasing force on the seal carrier 110 in the distal direction.

The seal carrier 110 is slidably accommodated in the longitudinal cylindrical cavity of the fitting body 102. The term "slidably accommodated" is used throughout herein to indicate that the seal carrier 110 is positioned relative to the fitting body 102 with sufficient clearance therebetween, enabling movement of the seal carrier 110 relative to the fitting body 102 in the proximal and distal directions. As such, the seal carrier 110 is not stationary, locked, or fixedly disposed in the fitting body 102, but is rather allowed to move relative to the fitting body 102.

Figure 3:
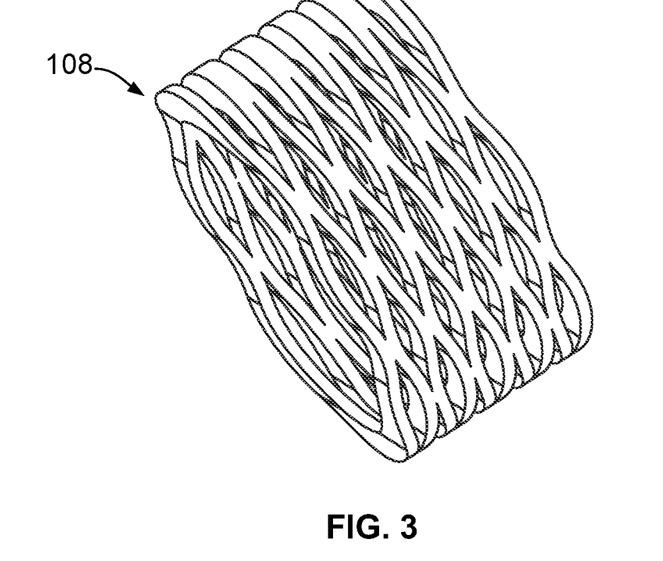
FIG. 3 illustrates a perspective view of a spring, in accordance with an example implementation.
Figure 4:
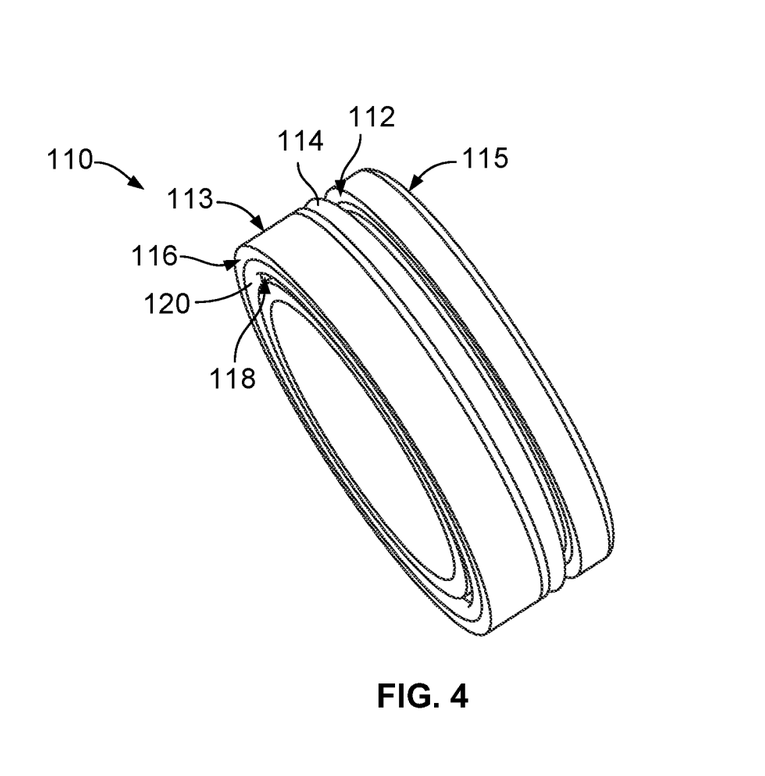
FIG. 4 illustrates a perspective view of a seal carrier, in accordance with an example implementation.
Figure 5:
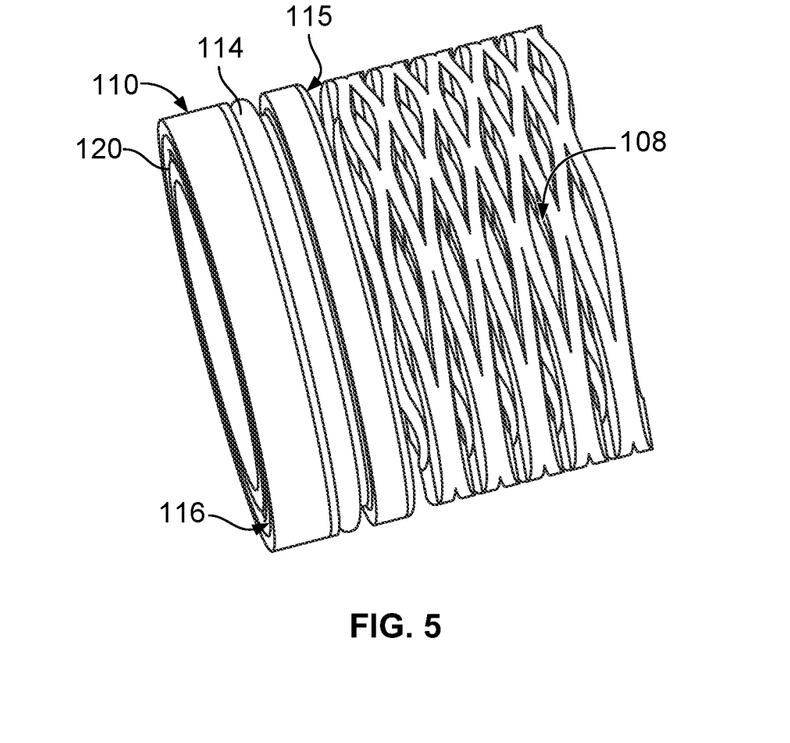
FIG. 5 illustrates a spring interfacing with a seal carrier, in accordance with an example implementation.

FIG. 3 illustrates a perspective view of the spring 108, FIG. 4 illustrates a perspective view of the seal carrier 110, and FIG. 5 illustrates the spring 108 interfacing with the seal carrier 110, in accordance with an example implementation.

Referring to FIG. 4, the seal carrier 110 has a first annular groove 112 disposed in an exterior peripheral surface 113 of the seal carrier 110. The first annular groove 112 is configured to receive a radial seal 114 (e.g., an O-ring) therein. The seal carrier 110 also includes a first end face 115, against which the distal end of the spring 108 rests, and a second end face 116 opposite the first end face 115. The second end face 116 of the seal carrier 110 defines or includes a second annular groove 118 configured to receive a face seal 120 therein. The face seal 120 can comprise any type of face seal such as O-ring, E-ring, C-ring, gasket, end-face mechanical seal, floating seal, due-cone seal, toric seal, etc.

Referring back to FIGS. 1-2, the fitting 100 is configured to couple to a fluid line without using threads. Particularly, the fitting body 102 has an exterior annular groove 122 that is configured to receive a retaining snap ring therein as described below to couple the fitting 100 to a fluid line.

Figure 6:
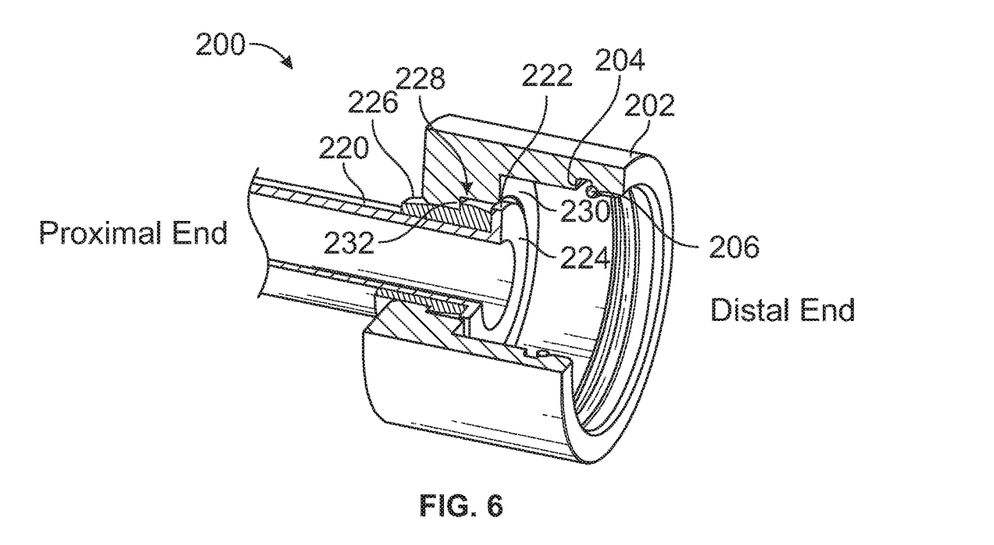
FIG. 6 illustrates a perspective partial cross-sectional view of a fluid line connector, in accordance with an example implementation.
Figure 7:
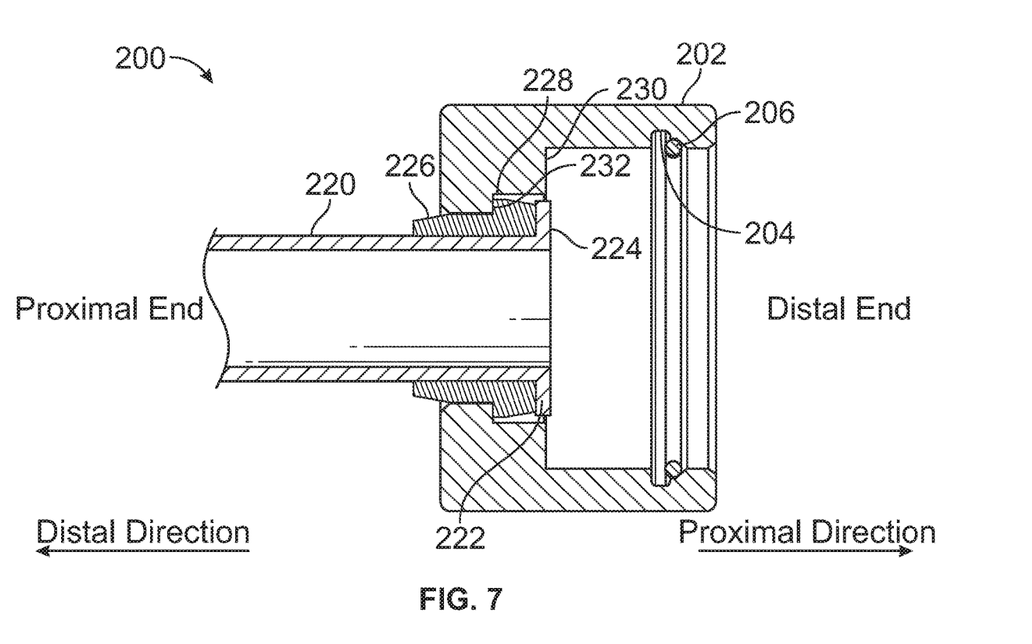
FIG. 7 illustrates a partial cross-sectional side view of the fluid line connector shown in FIG. 6, in accordance with an example implementation.

FIG. 6 illustrates a perspective partial cross-sectional view of a fluid line connector 200, and FIG. 7 illustrates a partial cross-sectional side view of the fluid line connector 200, in accordance with an example implementation. FIGS. 6 and 7 are described together. The fluid line connector 200 is configured to couple to the fitting 100 without using threads and maintain a sealed connection.

The fluid line connector 200 includes a coupling nut 202. The coupling nut 202 is configured to have an interior annular groove 204 disposed in an interior peripheral surface thereof. The fluid line connector 200 further includes a retaining snap ring 206 disposed in the interior annular groove 204.

The retaining snap ring 206 is configured as a resiliently or flexibly expandable lock ring. For instance, the retaining snap ring 206 can be made of flexible material such that the retaining snap ring 206 can be diametrically-compressed to be inserted within the coupling nut 202 and then once aligned axially with the interior annular groove 204, the retaining snap ring 206 can be released to expand and take its position within the interior annular groove 204.

In another example, the retaining snap ring 206 can be made as an incomplete or partial circular ring to render the retaining snap ring 206 flexible and facilitate mounting the retaining snap ring 206 in the interior annular groove 204. For instance, the retaining snap ring 206 can comprise a C-ring made of stainless steel. In this example, due to the retaining snap ring 206 being an incomplete ring, it is flexible and can be compressed then released to expand to facilitate its mounting within the coupling nut 202.

Figure 8:
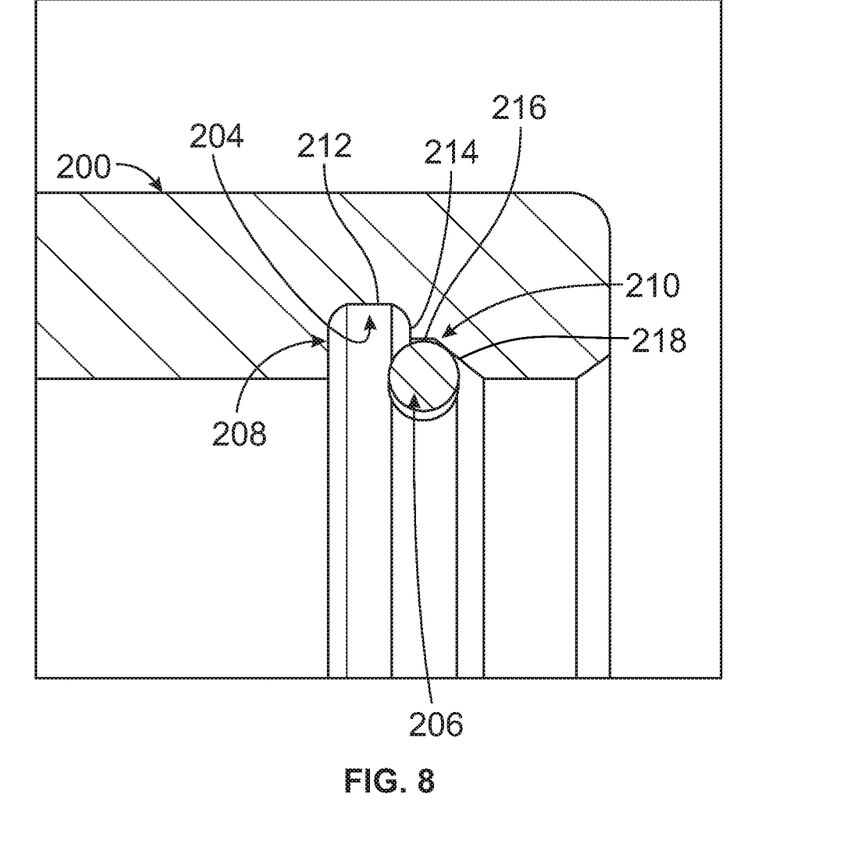
FIG. 8 illustrates a partial cross-sectional side view a couple nut showing construction of an interior annular groove, in accordance with an example implementation.

FIG. 8 illustrates a partial cross-sectional side view the couple nut 202 showing construction of the interior annular groove 204, in accordance with an example implementation. Particularly, FIG. 8 is a zoomed-in view of the cross-sectional side view of the coupling nut 202 shown in FIG. 7.

Configuration or geometry of the interior annular groove 204 may cause the retaining snap ring 206 to generate a large retention force. The interior annular groove 204 is bounded by a first annular surface 208 and a second annular surface 210. In the cross-sectional view of FIG. 8, while the first annular surface 208 is substantially straight (e.g., forms a substantially 90 degree angle with a base 212 of the interior annular groove 204), the second annular surface 210 comprises three portions at having different respective angles. Particularly, the second annular surface 210 can have a first portion 214 that is substantially straight with respect to the base 212; a second portion 216 that is substantially flat (e.g., parallel to the base 212); and a third portion 218 that is angled. As an example for illustration, the third portion 218 can make an angle between 30 degrees and 60 degrees with the second portion 216. However, other angles that are smaller or large can also be used.

As described below, the retaining snap ring 206 is configured to retain the coupling nut 202 to the fitting body 102, where the retaining snap ring 206 is partially inserted in the exterior annular groove 122 and partially inserted in the interior annular groove 204. When the fitting 100 is pulled apart from the fluid line connector 200 under fluid pressure or any other axial force, the retaining snap ring 206 can be pushed against the third portion 218, which is angled, thereby increase the retention force between the coupling nut 202 and the fitting body 102. Further, the third portion 218 being angled can reduce the likelihood that the coupling nut 202 can be decoupled or released from the fitting body 102 under axial forces.

Referring back to FIGS. 6-7, the fluid line connector 200 includes a fluid line 220 having a flanged end 222. The flanged end 222 is configured to have a flat surface 224 against which the distal end of the seal carrier 110 can be pushed via the spring 108 as described in detail below. The fluid line 220 is represented as a tube in FIGS. 6-7 and throughout this disclosure as an example. It should be understood, however, that other types of fluid lines such as a flexible hose can be used and a flat surface similar to the flat surface 224 can be formed at an end thereof to form a sealing surface for the seal carrier 110.

In an example, the fluid line 220 can initially be a straight tube without a flanged end. A tool can then be used to form the flanged end 222. An example of such a tool is the Parflange® Flaring and Flanging System sold by Parker-Hannifin Corporation.

In examples, the fluid line connector 200 can have a sleeve 226 disposed about the exterior peripheral surface of the fluid line 220, and the sleeve 226 can operate as an anvil when forming the flanged end 222 of the fluid line 220. Further, the sleeve 226 provides a flat exterior surface upon which that coupling nut 202 can be mounted to facilitate mounting the coupling nut 202 to the fluid line 220.

Particularly, in an example, the coupling nut 202 can have a stepped interior surface 228 to form a first interior annular shoulder 230 and a second interior annular shoulder 232. The sleeve 226 can have a corresponding stepped exterior surface that forms an exterior annular shoulder. The exterior annular shoulder of the sleeve 226 can mate with the second interior annular shoulder 232 of the coupling nut 202 when the coupling nut 202 is mounted to the fluid line 220. The coupling nut 202 can also slide axially relative to the sleeve 226 during assembly of the fluid line connector 200 and the fitting 100. In other examples, the coupling nut 202 can be configured to be mounted directly to the fluid line 220 without the sleeve 226.

Once the flanged end 222 is formed in the distal end of the fluid line 220, the sleeve 226 can preclude the fluid line 220 from being disassembled or "falling off" when pulled in the proximal direction. Similarly, the sleeve 226 and the flanged end 222 can preclude the coupling nut 202 from being disassembled or "falling off" when pulled in the distal direction.

The fitting 100 can be coupled to the fluid line connector 200 to fluidly couple another fluid line to the fluid line 220 or to couple the fluid line 220 to a manifold. For example, the fitting 100 can be aligned to the fluid line connector 200 such that the seal carrier 110 is aligned with the flanged end 222 of the fluid line 220. The fitting 100 can then be pushed in an axial direction toward the fluid line connector 200 until the seal carrier 110 interfaces with and contacts the flat surface 224 of the flanged end 222. The coupling nut 202 can then be pushed in an opposite axial direction or the fitting 100 can be pushed toward the fluid line connector 200 such that the fitting body 102 can slide axially within the coupling nut 202. As such, either the coupling nut 202 or the fitting body 102 can move relative to the other to assemble the fitting 100 and the fluid line connector 200.

As the coupling nut 202 is pushed axially along the exterior surface of the fitting body 102, the retaining snap ring 206 interacts with the flanged end 222 of the fluid line 220, which expands the retaining snap ring 206 radially outward in the interior annular groove 204. The retaining snap ring 206 can then slide further about the exterior surface of the fitting body 102 until the interior annular groove 204 of the coupling nut 202 is axially-aligned with the exterior annular groove 122 of the fitting body 102. The retaining snap ring 206 can then relax (e.g., snap or recoil radially inward) to snap into and occupy the annular space formed between the interior annular groove 204 and the exterior annular groove 122, thereby axially retaining the coupling nut 202 (along with the fluid line 220) to the fitting body 102.

With this configuration, the fitting 100 and the coupling nut 202 form a fluid connector system that can fluidly couple a fluid line such as the fluid line 220 to the fitting 100. Particularly, the fluid connector system comprising the fitting 100 and the coupling nut 202 is configured as a push-to-connect system wherein either the fitting 100 or the coupling nut 202 is pushed toward the other until the retaining snap ring 206 assumes the annular space formed between the interior annular groove 204 and the exterior annular groove 122, thereby retaining the coupling nut 202 to the fitting body 102.

Figure 9:
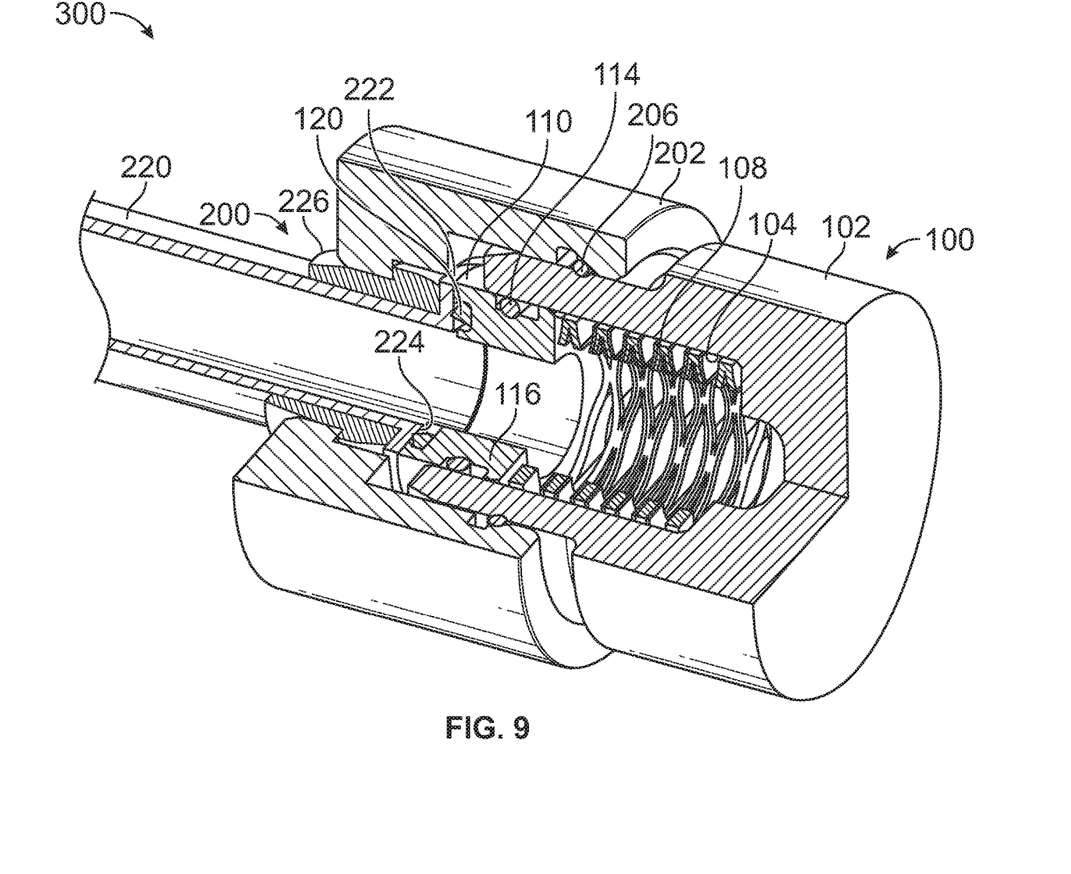
FIG. 9 illustrates a perspective partial cross-sectional view of an assembly of the fluid line connector shown in FIGS. 6-7 and the fitting shown in FIGS. 1-2, in accordance with an example implementation.
Figure 10:
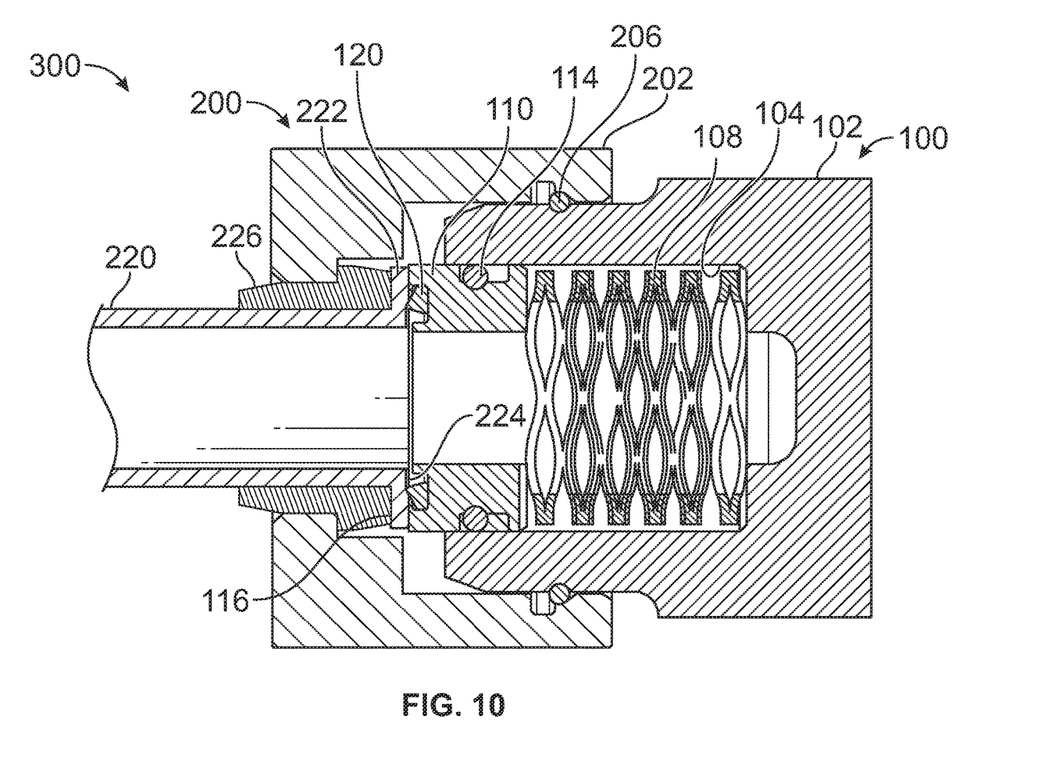
FIG. 10 illustrates a partial cross-sectional side view of the assembly shown in FIG. 9, in accordance with an example implementation.

FIG. 9 illustrates a perspective partial cross-sectional view of an assembly 300 of the fluid line connector 200 and the fitting 100, and FIG. 10 illustrates a partial cross-sectional side view of the assembly 300, in accordance with an example implementation. FIGS. 9 and 10 are described together.

Once the retaining snap ring 206 is in position, the fluid line connector 200 is coupled to the fitting 100. As such, no threaded engagement between the fluid line connector 200 and the fitting 100 is used to couple them to each other. As depicted in FIGS. 9-10, the spring 108 biases the seal carrier 110 toward the flanged end 222 of the fluid line 220 such that the second end face 116 of the seal carrier 110 contacts and interfaces with the flat surface 224 of the flanged end 222 of the fluid line 220. This way, the flat surface 224 of the flanged end 222 operates as a sealing surface with which the seal carrier 110 interfaces.

The radial seal 114 is disposed between the interior peripheral surface of the counterbore 104 and the exterior peripheral surface 113 of the seal carrier 110. Pressurized fluid flow through the longitudinal cylindrical cavity of the fitting body 102 squeezes or applies compression on an outside diameter and an inside diameter of the radial seal 114. The radial seal 114 thus seals an annular space between the interior peripheral surface of the counterbore 104 and the exterior peripheral surface 113 of the seal carrier 110. As such, fluid flowing through the fitting body 102 might not leak through the annular space between the interior peripheral surface of the counterbore 104 and the exterior peripheral surface 113 of the seal carrier 110 to an external environment of the fitting 100 or the assembly 300. The radial seal 114 can be configured as a dynamic seal to maintain an effective seal as the seal carrier 110 moves longitudinally within the counterbore 104.

Further, the spring 108 applies its biasing force on the seal carrier 110 toward the flat surface 224 of the flanged end 222 of the fluid line 220. As a result, a squeeze or compression force is applied to the top and bottom surfaces of the cross sections of the face seal 120. Thus, sealing surfaces of the face seal 120 are normal to a longitudinal axis of the face seal 120 and the seal carrier 110. The face seal 120 is thus configured to prevent leakage in the radial direction through the space between the second end face 116 of the seal carrier 110 and the flat surface 224 of the flanged end 222 of the fluid line 220. As such, fluid flowing through the fluid line 220 and the fitting 100 does not leak through the space between the second end face 116 of the seal carrier 110 and the flat surface 224 of the flanged end 222 of the fluid line 220 to an external environment of the assembly 300.

Referring now to FIGS. 1, 4 together, forces acting on the first end face 115 of the seal carrier 110 include the biasing force of the spring 108 and a fluid force applied on an effective annular surface area $A_1$ of the first end face 115 by pressurized fluid flowing through the fitting 100 and communicated to the first end face 115. These forces act on the seal carrier 110 toward the flat surface 224 of the flanged end 222. Pressurized fluid in the space between the second end face 116 of the seal carrier 110 and the flat surface 224 applies a force on an effective annular surface area $A_2$ of the second end face 116 of the seal carrier 110 in an opposite direction (e.g., away from the flat surface 224.) The term "effective annular surface area" is used herein to mean a portion of the surface area on which the fluid acts.

The seal carrier 110 is configured such that the effective annular surface area $A_1$ on which pressurized fluid acts toward the flat surface 224 is larger than the annular surface area $A_2$ on which pressurized fluid acts away from the flat surface 224 due to the presence of the face seal 120 in the second annular groove 118 disposed in the second end face 116 of the seal carrier 110. Assuming that the pressurized fluid has a pressure level "P," then the force acting on the effective annular surface area $A_1$ is $F_1=P \cdot A_1$, whereas the force acting on the effective annular surface area $A_2$ is $F_2=P \cdot A_2$. Because $A_1>A_2$, then $F_1>F_2$.

As a result, the pressurized fluid flowing through the fluid line 220 and the fitting 100 applies a differential or net force on the seal carrier 110 toward the flat surface 224. The net force applied to the seal carrier 110 and the biasing force of the spring 108 maintain an effective sealing contact between the second end face 116 and the flat surface 224, thereby facilitating sealing effectiveness of the face seal 120. The radial seal 114 acts as another or an added sealing element to preclude leakage to the external environment of the assembly 300.

If the pressure level P of the fluid flowing through the assembly 300 is low, thus rendering the forces $F_1$ and $F_2$ or the difference therebetween small or negligible, the biasing force of the spring 108 ensures that the seal carrier 110 is pushed toward the flat surface 224 to maintain effectiveness of the face seal 120. With this configuration, effective sealing by the face seal 120 is maintained whether the pressure level P is low or high. Particularly, at a low fluid pressure level, the spring 108 maintains effectiveness of sealing by the face seal 120, whereas at a high fluid pressure level both the net force applied by the pressurized fluid and the biasing force of the spring 108 on the seal carrier 110 maintain effective sealing by the by the face seal 120.

Further, with this configuration, as opposed to existing fitting configurations, effective sealing and the coupling of the fitting 100 to the fluid line 220 is not maintained or accomplished via threaded engagement. Rather, the configuration disclosed herein involves a push-to-connect fluid connector system where the fitting 100 and/or the coupling nut 202 are pushed toward one another until the retaining snap ring 206 snaps in position therebetween to maintain engagement or coupling of the coupling nut 202 to the fitting body 102. This way, disadvantages associated with using threaded engagements and predetermine torqueing levels can be avoided.

Further, if the width of the interior annular groove 204 (see FIGS. 6-8) or the exterior annular groove 122 (see FIGS. 1-2) is larger than a diameter of the retaining snap ring 206, then slop or backlash can occur. As an example for illustration, the retaining snap ring 206 can be allowed to "slop" or move axially within the grooves by 1 millimeter. Such slop or backlash can allow for axial play between the fitting 100 and the coupling nut 202. However, even if such axial play occurs, effective sealing between the fitting 100 and the fluid line 220 would be maintained due to the biasing force of the spring 108 and the net force applied by the pressurized fluid on the seal carrier 110 that ensure continual contact between the seal carrier 110 and the flat surface 224 and effective sealing by the face seal 120.

FIG. 11 is a flowchart of a method 1100 for assembling the fitting 100 and the fluid line connector 200, in accordance with an example implementation. The method 1100 may include one or more operations, functions, or actions as illustrated by one or more of blocks 1102-1108. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

Figure 12:
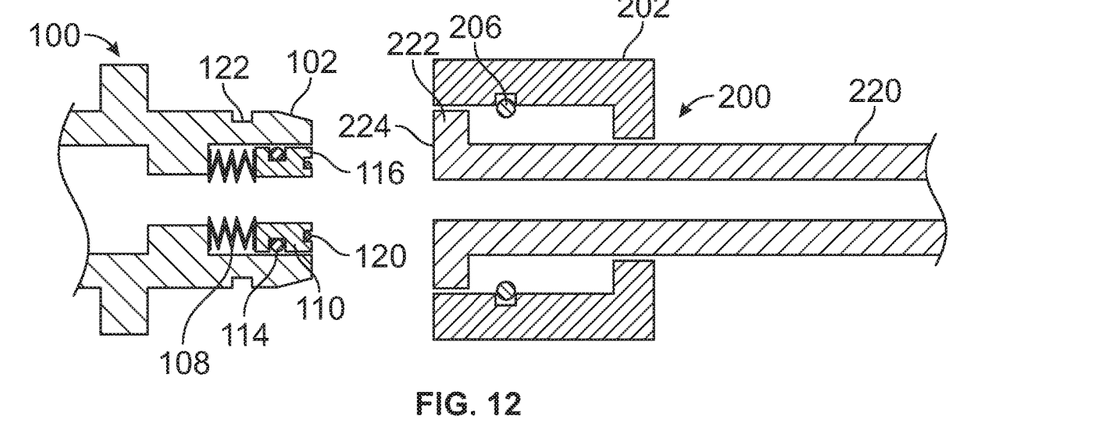
FIG. 12 illustrates a cross-sectional view of a fitting and a fluid line connector adjacent to each other, in accordance with an example implementation.
Figure 13:
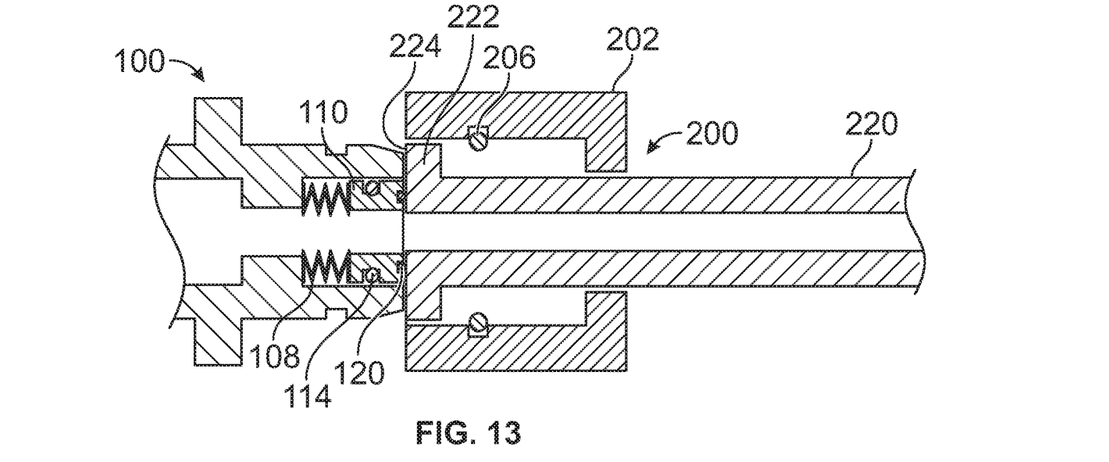
FIG. 13 illustrates a fitting aligned to a fluid line connector such that an end face of a seal carrier having a face seal interfaces with a flat surface of a flanged end of a fluid line, in accordance with an example implementation.
Figure 14:
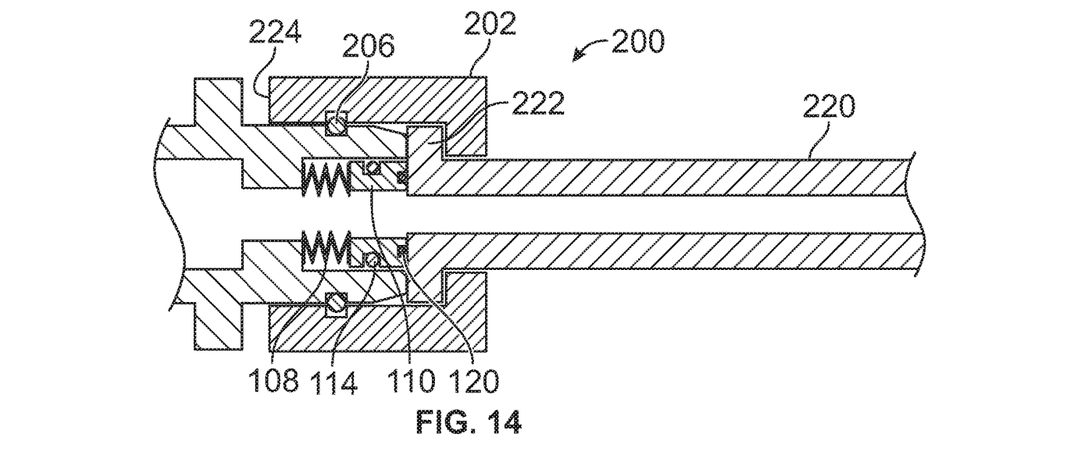
FIG. 14 illustrates a fitting coupled to a fluid line connector and a retaining snap ring retaining a fitting body to a coupling nut, in accordance with an example implementation.

Further, FIGS. 12, 13, and 14 show steps of assembling the fitting 100 and the fluid line connector 200 to illustrate steps of the method 1100. In FIGS. 12-14, the fitting 100 and the fluid line connector 200 are represented in a schematic, simplified manner to reduce visual clutter in the drawings. However, it should be understood that they correspond to the fitting 100 and the fluid line connector 200 described above with respect to FIGS. 1-10.

At block 1102, the method 1100 includes providing the fitting 100 comprising: (i) the fitting body 102 having the exterior annular groove 122 disposed about an exterior peripheral surface of the fitting body 102, (ii) the spring 108, and (iii) the seal carrier 110 having the first end face 115 interfacing with the spring 108, wherein the seal carrier 110 comprises: (a) a first annular groove 112 on an exterior peripheral surface of the seal carrier 110, wherein the first annular groove 112 has the radial seal 114 disposed therein, and (b) the second annular groove 118 formed in the second end face 116 of the seal carrier 110, wherein the second annular groove 118 has the face seal 120 disposed therein.

The term "providing" as used herein, and for example with regard to the fitting 100 or other components (e.g., the fluid line connector 200) includes any action to make any component available for use and assembly, such as supplying the component or bringing the component to an apparatus or to a work environment for further processing (e.g., assembly).

At block 1104, the method 1100 includes providing the fluid line connector 200 comprising: (i) the coupling nut 202 having the interior annular groove 204 disposed in an interior peripheral surface of the coupling nut 202, (ii) the retaining snap ring 206 disposed in the interior annular groove 204, (iii) the fluid line 220 comprising the flanged end 222 having the flat surface 224.

FIG. 12 illustrates a cross-sectional view of the fitting 100 and the fluid line connector 200 adjacent to each other, in accordance with an example implementation. An operator can place the fitting 100 and the fluid line connector 200 as show in FIG. 12 in preparation for coupling them to each other to couple the fluid line 220 to the fitting 100. The fitting 100 can then be coupled (on the other end thereof) to another fluid line (e.g., pipe, tube, or hose) or a manifold.

At block 1106, the method 1100 includes aligning the fitting 100 to the fluid line connector 200 such that the second end face 116 of the seal carrier 110 having the face seal 120 interfaces with the flat surface 224 of the flanged end 222 of the fluid line 220. FIG. 13 illustrates the fitting 100 aligned to the fluid line connector 200 such that the second end face 116 of the seal carrier having the face seal 120 interfaces with the flat surface 224 of the flanged end 222 of the fluid line 220, in accordance with an example implementation. In this position, the fitting 100 and/or the fluid line connector 200, and particularly the coupling nut 202, can be pushed toward each other to connect or couple the fitting 100 to the fluid line connector 200.

At block 1108, the method 1100 includes moving the fitting 100 in an axial direction relative to the coupling nut 202 until the exterior annular groove 122 of the fitting body 102 is aligned with the interior annular groove 204 of the coupling nut 202 and the retaining snap ring 206 occupies an annular space formed between the interior annular groove 204 and the exterior annular groove 122, thereby axially retaining the coupling nut 202 (along with the fluid line 220) to the fitting body 102 and coupling the fluid line 220 to the fitting 100, wherein the spring 108 applies a biasing force on the seal carrier 110 toward the flat surface 224 of the flanged end 222 of the fluid line 220 to maintain contact therebetween.

FIG. 14 illustrates the fitting 100 coupled to the fluid line connector 200 and the retaining snap ring 206 retaining the fitting body 102 to the coupling nut 202, in accordance with an example implementation. FIG. 14 corresponds to FIGS. 9-10 described above.

Relative motion of the fitting 100 and the coupling nut 202 can cause the fluid line 220, and particularly the flanged end 222 thereof, to move past the retaining snap ring 206, causing the retaining snap ring 206 to expand radially inward, and then once the flanged end 222 passes the retaining snap ring 206, the retaining snap ring 206 relaxes radially inward upon aligning the interior annular groove 204 with the exterior annular groove 122.

The term "relative to" is used herein to indicate that the fitting 100 can be moved toward the coupling nut 202, that the coupling nut 202 can be moved toward the fitting 100, or that both the fitting 100 and the coupling nut 202 can be moved toward each other.

The detailed description above describes various features and operations of the disclosed systems, assemblies, components, and methods with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. An assembly comprising:
   a fluid line connector comprising:
      a coupling nut having an interior annular groove formed in an interior peripheral surface of the coupling nut,
      a fluid line having a flat surface disposed within the coupling nut;
   a fitting comprising:
      a fitting body disposed, at least partially, within the coupling nut and comprising an exterior annular groove formed in an exterior peripheral surface of the fitting body, wherein the exterior annular groove of the fitting body is axially-aligned with the interior annular groove of the coupling nut, thereby forming an annular space therebetween,
      a seal carrier slidably accommodated in the fitting body and having: (i) a first end face, (ii) a second end face opposite the first end face, (iii) a first annular groove formed in an exterior peripheral surface of the seal carrier, wherein the first annular groove has a radial seal disposed therein, and (iv) a second annular groove formed in the second end face, wherein the second annular groove has a face seal disposed therein, and
      a spring having a first end fixedly disposed within the fitting body and a second end interfacing with the first end face of the seal carrier, wherein the spring applies a biasing force on the seal carrier toward the flat surface of the fluid line of the fluid line connector such that the second end face of the seal carrier having the face seal contacts the flat surface of the fluid line; and
   a retaining snap ring disposed in the annular space formed between the interior annular groove of the coupling nut and the exterior annular groove of the fitting body, thereby coupling the fitting body to the coupling nut.

2. The assembly of claim 1, wherein the fitting body has a counterbore formed therein, wherein the counterbore defines an annular shoulder within the fitting body, wherein the first end of the spring rests against the annular shoulder of the counterbore.

3. The assembly of claim 2, wherein the spring applies the biasing force on the seal carrier away from the annular shoulder of the fitting body toward the flat surface of the fluid line connector.

4. The assembly of claim 1, wherein the fluid line has a flanged end having the flat surface interfacing with the second end face of the seal carrier.

5. The assembly of claim 1, wherein the fluid line connector further comprises:
   a sleeve disposed about an exterior surface of the fluid line between the coupling nut and the fluid line.

6. The assembly of claim 5, wherein the fluid line has a flanged end having the flat surface interfacing with the second end face of the seal carrier, and wherein the sleeve is configured as an anvil when forming the flanged end of the fluid line.

7. The assembly of claim 5, wherein the coupling nut has a stepped interior surface forming a first annular shoulder, and wherein the sleeve has a corresponding stepped exterior surface that forms a second annular shoulder, wherein the second annular shoulder of the sleeve mates with the first annular shoulder of the coupling nut when the coupling nut is coupled to the fitting body.

8. A method comprising:
   providing a fitting comprising: (i) a fitting body having an exterior annular groove disposed about an exterior peripheral surface of the fitting body, (ii) a spring, and (iii) a seal carrier having a first end face interfacing with the spring, wherein the seal carrier comprises: (a) a first annular groove on an exterior peripheral surface of the seal carrier, wherein the first annular groove has a radial seal disposed therein, and (b) a second annular groove formed in a second end face of the seal carrier, wherein the second annular groove has a face seal disposed therein;
   providing a fluid line connector comprising: (i) a coupling nut having an interior annular groove disposed in an interior peripheral surface of the coupling nut, (ii) a retaining snap ring disposed in the interior annular groove, and (iii) a fluid line comprising a flanged end having a flat surface;
   aligning the fitting to the fluid line connector such that the second end face of the seal carrier having the face seal interfaces with the flat surface of the flanged end of the fluid line; and
   moving the fitting in an axial direction relative to the coupling nut until the exterior annular groove of the fitting body is aligned with the interior annular groove of the coupling nut and the retaining snap ring occupies an annular space formed between the interior annular groove and the exterior annular groove, thereby axially retaining the coupling nut to the fitting body and coupling the fluid line to the fitting, wherein the spring applies a biasing force on the seal carrier toward the flat surface of the flanged end of the fluid line such that the second end face of the seal carrier having the face seal contacts the flat surface of the fluid line.

9. The method of claim 8, further comprising:
   mounting the coupling nut to the fluid line; and
   after mounting the coupling nut to the fluid line, forming the flanged end of the fluid line.

10. The method of claim 9, further comprising:
    mounting a sleeve about an exterior surface of the fluid line; and
    using the sleeve as an anvil while forming the flanged end.

11. The method of claim 10, wherein the coupling nut has a stepped interior surface forming a first annular shoulder, and wherein the sleeve has a corresponding stepped exterior surface that forms a second annular shoulder, and wherein mounting the coupling nut to the fluid line comprises:
    mounting the coupling nut to the sleeve such that the second annular shoulder of the sleeve mates with the first annular shoulder of the coupling nut when the coupling nut is coupled to the fitting body.

12. A fluid connector system comprising:
a coupling nut having an interior annular groove formed in an interior peripheral surface of the coupling nut
a fluid line;
a sleeve disposed about an exterior surface of the fluid line between the coupling nut and the fluid line;
a retaining snap ring disposed in the interior annular groove of the coupling nut; and
a fitting comprising:
a fitting body configured to be disposed, at least partially, within the coupling nut and comprising an exterior annular groove formed in an exterior peripheral surface of the fitting body, wherein the exterior annular groove of the fitting body is configured to receive the retaining snap ring therein to couple the fitting body to the coupling nut, wherein the coupling nut has a stepped interior surface forming a first annular shoulder, and wherein the sleeve has a corresponding stepped exterior surface that forms a second annular shoulder, wherein the second annular shoulder of the sleeve mates with the first annular shoulder of the coupling nut when the coupling nut is coupled to the fitting body,
a seal carrier slidably accommodated in the fitting body and having: (i) a first end face, (ii) a second end face opposite the first end face, (iii) a first annular groove formed in an exterior peripheral surface of the seal carrier, wherein the first annular groove is configured to receive a radial seal therein, and (iv) a second annular groove formed in the second end face, wherein the second annular groove is configured to receive a face seal therein, and
a spring having a first end fixedly disposed within the fitting body and a second end interfacing with the first end face of the seal carrier such that the spring applies a biasing force on the seal carrier.

13. The fluid connector system of claim 12, wherein the fitting body has a counterbore formed therein, wherein the counterbore defines an annular shoulder within the fitting body, wherein the first end of the spring rests against the annular shoulder of the counterbore.

14. The fluid connector system of claim 13, wherein the spring applies the biasing force on the seal carrier away from the annular shoulder of the fitting body.

15. The fluid connector system of claim 12, wherein the interior annular groove of the coupling nut is bounded by a first annular surface and a second annular surface, wherein the first annular surface is straight, whereas the second annular surface comprises one or more portions disposed at different respective angles.

* * * * *